United States Patent
Nagai et al.

(10) Patent No.: US 8,922,084 B2
(45) Date of Patent: Dec. 30, 2014

(54) ROTOR CORE

(75) Inventors: Akira Nagai, Kitakyushu (JP); Go Kato, Kitakyushu (JP)

(73) Assignee: Mitsui High-Tech, Inc., Fukuoka (JP)

( * ) Notice: Subject to any disclaimer, the term of this patent is extended or adjusted under 35 U.S.C. 154(b) by 436 days.

(21) Appl. No.: 13/377,938

(22) PCT Filed: Apr. 28, 2010

(86) PCT No.: PCT/JP2010/057557
§ 371 (c)(1),
(2), (4) Date: Dec. 13, 2011

(87) PCT Pub. No.: WO2010/150592
PCT Pub. Date: Dec. 29, 2010

(65) Prior Publication Data
US 2012/0091846 A1    Apr. 19, 2012

(30) Foreign Application Priority Data
Jun. 23, 2009 (JP) ................. 2009-148920

(51) Int. Cl.
*H02K 1/27* (2006.01)
*H02K 15/03* (2006.01)

(52) U.S. Cl.
CPC ............ *H02K 1/2766* (2013.01); *H02K 15/03* (2013.01)
USPC .......... 310/156.53; 310/156.56; 310/216.004; 310/114

(58) Field of Classification Search
USPC ............... 310/156.53, 156.56, 112, 216.004, 310/216.015, 216.016, 216.018, 114
See application file for complete search history.

(56) References Cited

U.S. PATENT DOCUMENTS 6,867,524 B2 * 3/2005 Liang .................. 310/156.47
7,057,322 B2 * 6/2006 Araki et al. ............ 310/156.53

(Continued)

FOREIGN PATENT DOCUMENTS

JP      11-4555       1/1999
JP    2000-8146    *  1/2000  ............ C22C 38/00

(Continued)

OTHER PUBLICATIONS

English Machine Translation, Egawa et al. JP 2006-025572, Jan. 2006.*
Japan Office action, dated Oct. 8, 2013 along with an english translation thereof.

*Primary Examiner* — Burton Mullins
(74) *Attorney, Agent, or Firm* — Greenblum & Bernstein P.L.C.

(57) ABSTRACT

There is provided a rotor core which increases the quality and reliability thereof by preventing the occurrence of a core separation of the rotor core. There is provided a rotor core including a plurality of substantially cylindrical core blocks which are stacked on each other; and a plurality of magnets, characterized in that a plurality of magnet holes extending in an axial direction are provided in the plurality of core blocks so as to extend over the plurality of core blocks in that the plurality of magnets are accommodated in each of the plurality of magnet accommodation holes and fixed therein with a resin, and in that an axial position of core block boundary planes where the plurality of core blocks are brought into abutment with each other and an axial position of magnet boundary planes where the plurality of magnets are brought into abutment with each other differ from each other.

5 Claims, 5 Drawing Sheets

(56) References Cited

U.S. PATENT DOCUMENTS

| | | | |
|---|---|---|---|
| 7,397,159 B2* | 7/2008 | Yoshinaga | 310/156.47 |
| 7,518,277 B2* | 4/2009 | Nemoto et al. | 310/156.47 |
| 8,020,280 B2* | 9/2011 | Fukumaru et al. | 29/598 |
| 8,362,668 B2* | 1/2013 | Takahashi et al. | 310/156.47 |
| 2009/0108697 A1 | 4/2009 | Uetsuji et al. | |
| 2009/0174273 A1* | 7/2009 | Watanabe et al. | 310/156.53 |
| 2011/0000079 A1 | 1/2011 | Fukumaru et al. | |

FOREIGN PATENT DOCUMENTS

| | | | | |
|---|---|---|---|---|
| JP | 2006-025572 | | 1/2006 | |
| JP | 2007-215301 | | 8/2007 | |
| JP | 2007-282392 | | 10/2007 | |
| JP | 2008-125242 | | 5/2008 | |
| JP | 2009-33958 | | 2/2009 | |
| JP | 2009-112096 | | 5/2009 | |
| WO | 2009-069575 | * | 6/2009 | H02K 1/22 |

* cited by examiner

Related Art

Related Art

Related Art

ROTOR CORE

TECHNICAL FIELD

The present invention relates to a rotor core having a plurality of magnets in an interior thereof.

BACKGROUND ART

Patent Literature 1 proposes a method for fixing magnets within a magnet accommodation hole which is formed in a substantially cylindrical rotor core along an axial direction thereof. This fixing method is a method comprising, as FIGS. 4A, 4B show, the steps of forming a rotor core 60 by stacking and fixed therein a plurality of electromagnetic steel plates (core pieces) 69, accommodating magnet pieces 62 in a magnet accommodation hole 61 in the rotor core 60, and filling a resin 63 into the magnet accommodation hole 61 from a resin pot 65 formed in an upper mold 64 for integration of the rotor core 60 with the resin. Here, in the figures, reference numeral 67 denotes a plunger for pushing the resin 63 out, and reference numeral 68 denotes a lower mold.

RELATED ART LITERATURE

Patent Literature

Patent Literature 1: JP-A-2007-215301

SUMMARY OF THE INVENTION

Problem that the Invention is to Solve

In the fixing method described in Patent Literature 1 above, the resin 63 which is heated to melt is filled in the magnet accommodation hole 61, and therefore, the rotor core 60 and the magnet pieces 62 need to be heated approximately to 140 to 180° C. As this occurs, the linear expansion coefficient of the core piece 69 is smaller than the linear expansion coefficient of the resin 63 such as an epoxy resin, and therefore, in such a state that the core pieces 69 and the resin 63 are cooled down to a normal temperature, due to a difference in thermal shrinkage amount between the core piece 69 and the resin 63, a compressive stress is applied to the resin in an Z-axis direction, while a tensile stress as a reaction force of the compressive stress is applied to the core pieces 69. Consequently, when the fastening force of the plurality of core pieces 69 which make up the rotor core 60 is weak, there are fears that a core separation may occur in which the core pieces 69 are separated in the Z-axis direction.

Further, as FIGS. 5A, 5B show, core blocks 70, 71 are each formed by clamping and fixed therein a plurality of core pieces 69 which are stacked and fixed therein. The core blocks 70, 71 are stacked and fixed therein and are connected and fixed therein by welding or with a screw into a rotor core 60. Then, magnets 62 are fixed within the magnet accommodation hole 61 formed in the rotor core 60. When this configuration is adopted, a larger connecting strength is provided by the connection through clamping than by the connection by welding or with the screw, and therefore, a core separation is easy to occur in a boundary plane 73 between the core blocks 70, 71.

Furthermore, in recent years, as FIGS. 5A, 5B show, in order to increase the magnetic force properties of a motor, the configuration is used more and more in which the plurality of magnet pieces 62 are accommodated in series in the magnet accommodation hole 61 in the rotor core 60. Also, in the relationship between the magnet pieces 62 and the resin 63, as has been described above, the linear expansion coefficient of the magnet piece 62 such as a neodymium magnet is smaller than the linear expansion coefficient of the resin 63, and therefore, in such a state that the magnet pieces 62 and the resin 63 are cooled down to the normal temperature, due to the difference in thermal shrinkage amount between the magnet piece 62 and the resin 63, the compressive force is applied to the resin 63 in the Z-axis direction, while the tensile stress which is the reaction force of the compressive force is applied to the magnet pieces 62. Consequently, a crack is easy to be produced in a boundary plane 72 between the adjacent magnet pieces 62, and there are fears that the crack may develop to a core separation. Consequently, when the position of the boundary plane 72 between the magnet pieces 62 in the Z-axis direction (the position in a height direction) coincides with the position of a boundary plane 73 between the core blocks 70, 71 in the same direction, the core separation becomes easy to occur particularly.

The invention has been made in view of these situations, and an object thereof is to provide a rotor core which can increase the quality and reliability thereof by preventing a core separation of the rotor core.

Means for Solving the Problem

With a view to attaining the object above, the followings are provided according to the invention.
(1) A rotor core comprising:
  a plurality of substantially cylindrical core blocks which are stacked on each other; and
  a plurality of magnets, characterized in that
  a plurality of magnet holes extending in an axial direction are provided in the plurality of core blocks so as to extend over the plurality of core blocks, in that
  the plurality of magnets are accommodated in each of the plurality of magnet accommodation holes and fixed therein with a resin, and in that
  an axial position of a core block boundary plane where the plurality of core blocks are brought into abutment with each other and an axial position of a magnet boundary plane where the plurality of magnets are brought into abutment with each other differ from each other.
(2) A rotor core as set forth under (1), characterized in that the plurality of magnets have the same length, and in that assuming that the length of the magnet is b, an axial dimension of the core block is not a multiple of b.
(3) A rotor core as set forth under (1) or (2), characterized in that
  an axial dimension of at least one of the core blocks differs from an axial dimension of the other core block.
(4) A rotor core as set forth under (1) or (2), characterized in that
  an axial position of the core block boundary plane and an axial position of the magnet boundary plane are spaced not less than 1 mm apart from each other.
(5) A rotor core as set forth under (1) or (2), characterized in that
  the core blocks which are in abutment with each other are stacked on each other with one or the other core block rotated through 180 degrees in a circumferential direction.

Advantage of the Invention

In the rotor core according to the invention, the magnet accommodation holes are provided to extend over the plurality of core blocks, and the axial position of the core block boundary plane and the axial position of the magnet boundary plane differ from each other. Therefore, one magnet piece is positioned so as to extend over the core block boundary plane. In addition, the magnet piece extending over the core block boundary plane is fixed with the resin, and therefore, the plurality of core blocks which are in abutment with each other can be coupled together strongly, thereby making it possible to prevent the occurrence of a core separation. Consequently, the quality and reliability of the rotor core are increased. Further, when the magnets used have the same length, the necessity is obviated of preparing a plurality of types of magnets, whereby the productivity in terms of fabrication of rotor cores is increased.

MODE FOR CARRYING OUT THE INVENTION

Hereinafter, embodiments of the invention will be descried by reference to the drawings.

Figure 1:
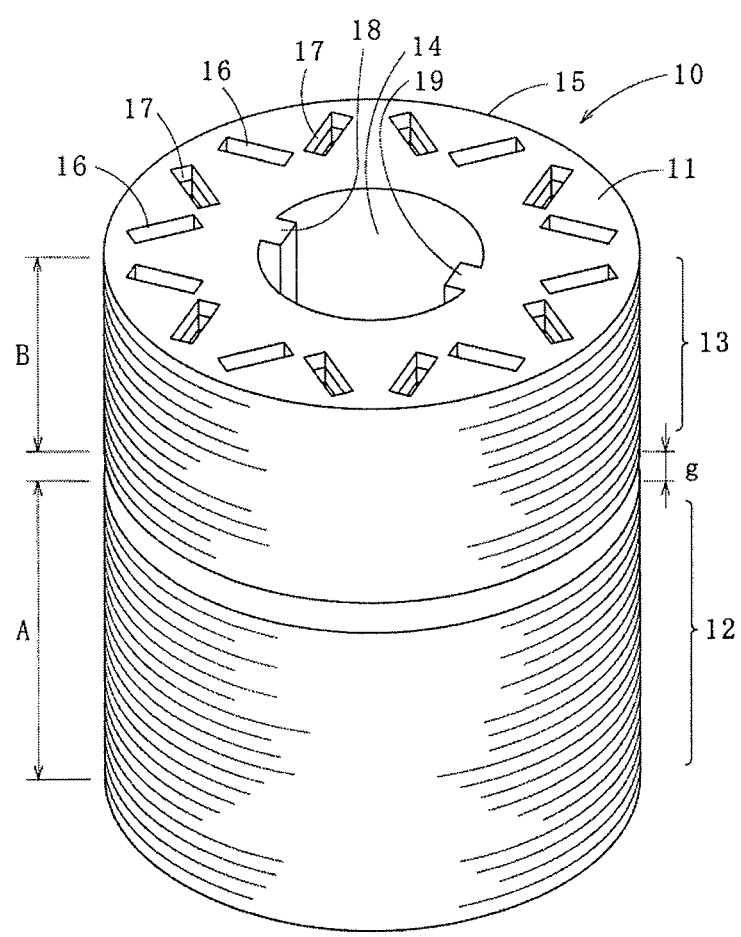
FIG. 1 is a perspective view of a rotor core according to a first embodiment of the invention.
Figure 2:
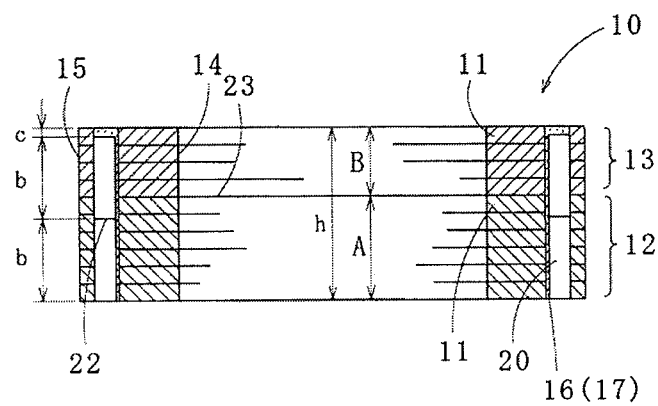
FIG. 2 is a vertical sectional view of the rotor core shown in FIG. 1.

As FIGS. 1, 2 show, a rotor core 10 according to a first embodiment invention includes a plurality of (two in the illustrated example) substantially cylindrical core blocks 12, 13 which are stacked on each other. The core blocks 12, 13 are each formed by stacking and clamping together a plurality of core pieces 11 which are punched out from a sheet of magnetic iron.

The core block 13 lying above an upper portion of the core block 12 is stacked thereabove while being rotated through 180 degrees in a circumferential direction with respect to the core block 12. Due to there being variation in thickness of rolled sheet metal from which core pieces 11 are punched, when the core blocks 12, 13 are formed by stacking core pieces 11 together, there may be a situation in which variation in thickness (a dimension in a stacking direction) is produced in a circumferential direction.

To cope with this, the plurality of core blocks 12, 13 are stacked on each other with one or the other core block rotated in the circumferential direction so that the overall thickness of the rotor core 10 is made uniform.

The upper and lower core blocks 12, 13 may be coupled together through welding or with a screw as required (this will be true in the following embodiments).

The core blocks 12, 13 are each formed into a substantially cylindrical shape which includes a shaft hole 14 in the center thereof. An axial direction of the cylindrical core blocks 12, 13 is a vertical direction as viewed on sheets of paper on which FIGS. 1 and 2 are drawn.

Elongated projections 18, 19, adapted to function as keys, are provided on an inner circumferential surface of the shaft hole 14 so as to face each other. In stacking a plurality of core pieces 11, for example, these elongated projections 18, 19 are used to facilitate the positioning of the core pieces 11 in the circumferential direction. In addition, in stacking the core blocks 12, 13, the elongated projections 18, 19 can be used to facilitate the positioning of the core blocks 12, 13 in the circumferential direction.

Pairs (eight pairs in the illustrated example) of magnet accommodation holes 16, 17 are provided between the shaft hole 14 and outer circumferential edges of the core blocks 12, 13 so as to extend in the axial direction. Each of the pair of magnet accommodation holes 16, 17 has a rectangular section which extends fro a radially inner side to a radially outer side, and a space between radially inner sides of the pair of magnet accommodation holes 16, 17 is narrower than a space between radially outer sides thereof. In addition, the pair of magnet accommodation holes 16, 17 are axially symmetrical with each other with respect to the radial direction. Additionally, as FIG. 2 shows, the magnet accommodation holes 16, 17 are formed so as to extend over the core blocks 12, 13. In this embodiment, the magnet accommodation holes 16, 17 are formed so as to penetrate through the core blocks 12, 13.

The magnet accommodation holes 16, 17 each accommodate a plurality of magnet pieces 20 having the same length in series; the magnet piece 20 being made up of a non-magnetized permanent magnet having a rectangular section. The sectional areas of the magnet accommodation holes 16, 17 are larger than the sectional area of the magnet piece 20 so that they can accommodate the magnet pieces 20 with a space defined therebetween. In addition, assuming that the length of the magnet piece 20 is b and the number of magnet pieces 20 which are placed in each of the magnet accommodation holes 16, 17 is n, a height h of the rotor core 10 is expressed by $h=b \times n+c(0<c<1.2 \text{ mm})$. There is no limitation imposed on the kind of magnets used, provided that they are permanent magnets. A neodymium magnet having a large magnetic force can preferably be used.

In this embodiment, n=2. Although the core blocks 12, 13 are illustrated as being spaced apart from each other with a gap g provided therebetween for the sake of easy understanding in FIG. 1, in reality, g=0.

A height A of the core block 12 is set longer than the length of the magnet piece 20, and a height B of the core block 13 is set shorter than the length of the magnet piece 20. By making the length of the plurality of magnet pieces 20 be the same and making the heights A, B of the core block 12 and the core block 13 differ from each other, the position of a magnet boundary plane 22 where the upper and lower magnet pieces 20 are brought into abutment with each other is made to be offset not less than 1 mm in the axial direction from the position of a core block boundary plane 23 where the upper and lower core blocks 12, 13 are brought into abutment with each other.

In this embodiment, the relationship between the heights A, B of the core blocks 12, 13 is expressed by A=B+K (where, K=1.2 mm or larger). Here, K denotes a thickness which is a total thickness of four or more core pieces 11 (for example, 0.3 mm). As has been described above, due to there being variation in thickness of core pieces 11 which make up the core blocks 12, 13, there may be a situation in which the circumferential thicknesses of the core blocks 12, 13 differ or there is variation in height dimension of magnet pieces. Because of this, in order to make the axial position of the core block boundary plane 23 differ from the axial position of the magnet boundary plane 22 in an ensured fashion without relying on the variations in thickness of the core blocks 12, 13 and dimension of the magnet pieces, the heights of the core blocks 12, 13 are made to differ so that the axial position of the core block boundary plane 23 is spaced 1 mm or more from the axial position of the magnet boundary plane 22.

In this way, the core blocks 12, 13 are stacked on each other with one or the other core block rotated, the magnet pieces 20 are accommodated in the magnet accommodation holes 16, 17, for example, the core blocks 12, 13 are held between the lower mold and the upper mold, the resin melted by the plunger is poured into the magnet accommodation holes 16, 17 from the resin pot provided in the upper mold, the core blocks 12, 13 are heated further to set the resin, and the plurality of magnet pieces 20 are fixed in each of the magnet accommodation holes 16, 17.

Figure 3:
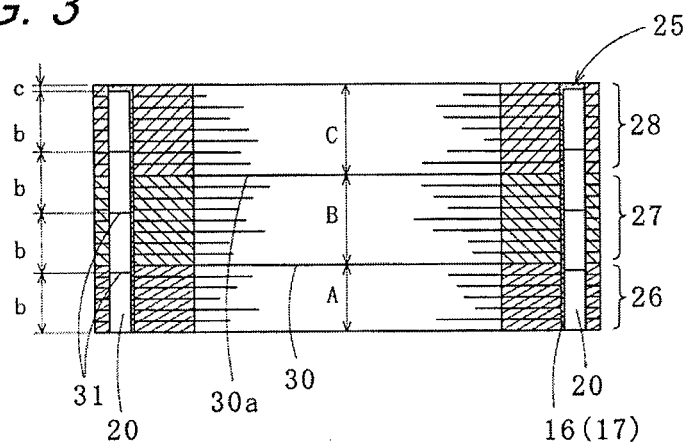
FIG. 3 is a vertical sectional view of a rotor core according to a second embodiment of the invention.
Figure 4A:
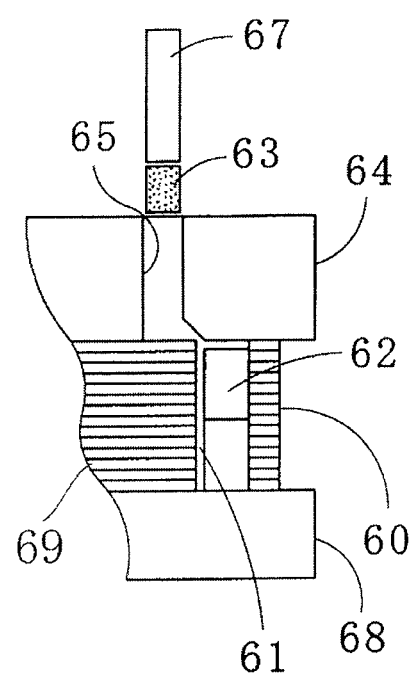
FIG. 4A is an explanatory diagram of a fabrication method of a rotor core according to a conventional example.
Figure 4B:
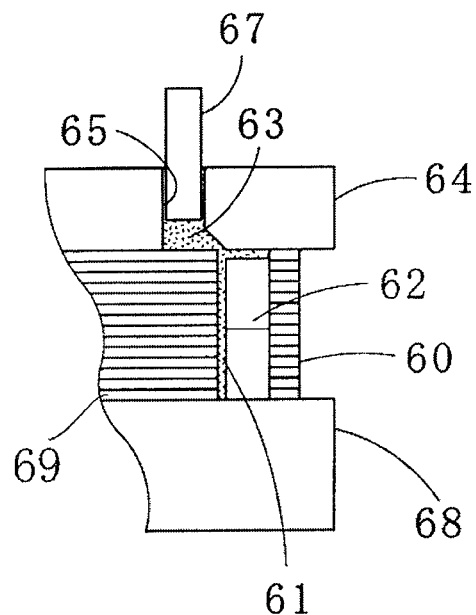
FIG. 4B is an explanatory diagram of the fabrication method of the rotor core according to the conventional example.
Figure 5A:
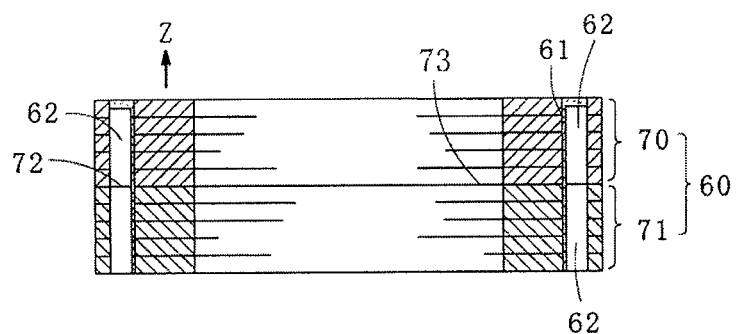
FIG. 5A is an explanatory diagram showing a state in which a rotor core according to a reference example is in use.
Figure 5B:
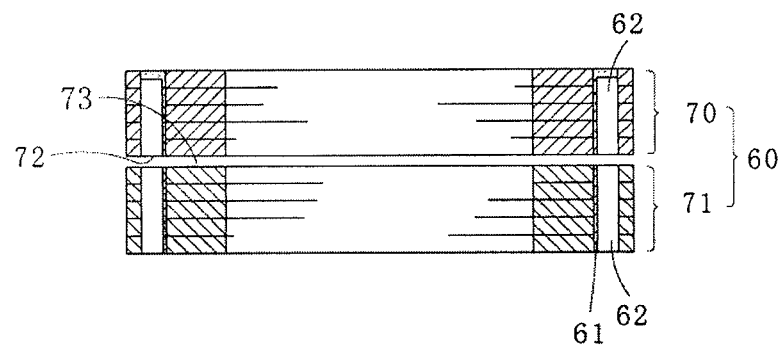
FIG. 5B is an explanatory diagram showing the state in which the rotor core according to the reference example is in use.

Following this, a rotor core 25 according to a second embodiment of the invention shown in FIG. 3 will be described. In this rotor core 25, three core blocks 26, 27, 28 are stacked one on another while they are rotated through 120 degrees. In addition, a plurality of (four in this embodiment) magnet pieces 20 are accommodated in each of magnet accommodation holes 16, 17 which are provided in the three core blocks 26, 27, 28 so as to penetrate therethrough and are then fixed therein with a resin. In this embodiment, too, vertical abutment positions of the core blocks 26, 27, 28, that is, axial positions of core block boundary planes 30, 30a are made to differ from axial positions of magnet boundary planes 31 where the vertically adjacent magnet pieces 20 are brought into abutment with one another.

In addition, in this rotor core 25, the core block 26, the core block 27 and the core block 28 are stacked sequentially in that order from bottom to top. A height A of the core block 26 is lower than a height B of the core block 27 which lies on an upper portion of the core block 26. In addition, the height B of the core block 27 and a height C of the core block 28 which lies on an upper portion of the core block 27 are the same (namely, A<B=C). By this configuration, the axial position of the core block boundary planes 30, 30a between the vertically adjacent core blocks 26, 27, 28 is made differ from the axial position of the magnet boundary planes 31 between the magnet pieces 20.

In this embodiment, although the height A of the core block 26 in the plurality of core blocks 26, 27, 28 is made to differ from the heights of the other core blocks 27, 28, by making the heights A, B, C of all the core blocks 26, 27, 28 differ, the axial position of the core block boundary planes 30, 30a where the core blocks 26, 27, 28 are brought into abutment with one another can be made to differ from the axial position of the magnet boundary planes 31 where the magnet pieces 20 are brought into abutment with one another. As this occurs, assuming that the length of the magnet piece 20 is b, the respective heights A, B, C of the core blocks 26, 27, 28 are set to values which are not a multiple of b. In FIG. 3, reference character c denotes a gap (normally, larger than 0 and smaller than 1.2 mm) between an apex portion the magnet piece 20 and an apex portion of the rotor core 25.

In the rotor cores 10, 25 according to the first and second embodiments that have been described heretofore, one magnet piece 20 exists so as to extend over the positions of the core block boundary planes 23, 30, 30a which constitute joints between the adjacent core blocks 12, 13, 26, 27, 28, and therefore, even in the event that the adjacent core blocks 12, 13, 26, 27, 28 are not coupled together through welding, the adjacent core blocks 12, 13, 26, 27, 28 can be coupled together strongly by the resin including the magnet core 20 as a core material. Therefore, the occurrence of a core separation can be prevented, and hence, the quality and reliability of the rotor core is increased.

The invention is not limited to the embodiments that have been described above, and hence, the shape and dimensions of the core can be altered or modified without departing from the spirit and scope of the invention.

This patent application is based on Japanese Patent Application (No. 2009-148920) filed on Jun. 23, 2009, the contents of which are to be incorporated herein by reference.

INDUSTRIAL APPLICABILITY

According to the rotor core according to the invention, the core blocks which are in abutment with each other can be coupled together strongly and rigidly so as to prevent the occurrence of a core separation. Therefore, the quality and reliability of the rotor core are increased. Further, when the lengths of the magnet pieces used are made the same, the necessity is obviated of using a plurality of kinds of magnets, whereby the productivity in terms of fabrication of rotor cores is increased.

What is claimed is:

1. A rotor core comprising:
   a plurality of substantially cylindrical core blocks which are stacked on each other; and
   a plurality of magnets, wherein
   a plurality of magnet holes extending in an axial direction are provided in the plurality of core blocks so as to extend over the plurality of core blocks,
   the plurality of magnets are accommodated in each of the plurality of magnet accommodation holes and fixed therein with a resin,
   the plurality of magnets each have a length b,
   an axial dimension of at least one of the core blocks differs from an axial dimension of the other core block, and
   an axial position of a core block boundary plane where the plurality of core blocks are brought into abutment with each other and an axial position of a magnet boundary plane where the plurality of magnets are brought into abutment with each other differ from each other.

2. The rotor core as set forth in claim 1, wherein
   an axial dimension of the core block is not a multiple of b.

3. The rotor core as set forth in claim 1, wherein
   an axial position of the core block boundary plane and an axial position of the magnet boundary plane are spaced not less than 1 mm apart from each other.

4. The rotor core as set forth in claim 1, wherein
   the core blocks, which are in abutment with each other, are stacked on each other such that adjacent core blocks are rotated 180 degrees in a circumferential direction relative to each other.

5. The rotor core as set forth in claim 1, wherein
   at least one of the plurality of magnets extends over the core block boundary plane.

* * * * *